United States Patent
Feng et al.

(10) Patent No.: US 11,983,820 B2
(45) Date of Patent: May 14, 2024

(54) INFORMATION PROCESSING METHOD AND DEVICE, POSITIONING METHOD AND DEVICE, ELECTRONIC DEVICE AND STORAGE MEDIUM

(71) Applicant: Zhejiang SenseTime Technology Development Co., Ltd., Zhejiang (CN)

(72) Inventors: Youji Feng, Hangzhou (CN); Zhichao Ye, Hangzhou (CN); Jiacheng Jin, Hangzhou (CN); Guofeng Zhang, Hangzhou (CN)

(73) Assignee: ZHEJIANG SENSETIME TECHNOLOGY DEVELOPMENT CO., LTD, Zhejiang (CN)

(*) Notice: Subject to any disclaimer, the term of this patent is extended or adjusted under 35 U.S.C. 154(b) by 196 days.

(21) Appl. No.: 17/551,865

(22) Filed: Dec. 15, 2021

(65) Prior Publication Data
US 2022/0108528 A1    Apr. 7, 2022

Related U.S. Application Data

(63) Continuation of application No. PCT/CN2019/118453, filed on Nov. 14, 2019.

(30) Foreign Application Priority Data

Jul. 29, 2019  (CN) .......................... 201910690235.0

(51) Int. Cl.
*G06T 19/00*  (2011.01)
*G06T 3/20*  (2006.01)
(Continued)

(52) U.S. Cl.
CPC ............... *G06T 19/00* (2013.01); *G06T 3/20* (2013.01); *G06T 3/40* (2013.01); *G06T 3/60* (2013.01);
(Continued)

(58) Field of Classification Search
CPC .. G06T 19/00; G06T 3/20; G06T 3/40; G06T 3/60
See application file for complete search history.

(56) References Cited

U.S. PATENT DOCUMENTS 10,353,073 B1   7/2019  Anderberg
2014/0301633 A1* 10/2014  Furukawa ............... G06T 17/00
                                          382/154
(Continued)

FOREIGN PATENT DOCUMENTS

CN        104217458 A     12/2014
CN        105469388 A      4/2016
(Continued)

OTHER PUBLICATIONS

First Office Action of the Chinese application No. 201910690235.0, dated Jan. 26, 2022, 14 pgs.
(Continued)

*Primary Examiner* — Matthew Salvucci
(74) *Attorney, Agent, or Firm* — Cooper Legal Group, LLC

(57) ABSTRACT

An information processing method includes: three-dimensional (3D) point information of a 3D point cloud is obtained; a two-dimensional (2D) point cloud image from projection of the 3D point cloud on a horizontal plane is generated based on the 3D point information; and projection coordinates of 3D points comprised in the 3D point cloud in a reference coordinate system of a reference plane graph are determined based on a consistency degree that the 2D point cloud image has with the reference plane graph, where the reference plane graph is used for representing a projection graph with reference coordinates that is obtained through the
(Continued)

projection of a target object on the horizontal plane, and the 3D point cloud is used for representing 3D space information of the target object.

19 Claims, 7 Drawing Sheets

(51) Int. Cl.
 G06T 3/40 (2006.01)
 G06T 3/60 (2006.01)
 G06T 7/70 (2017.01)
(52) U.S. Cl.
 CPC ...... *G06T 7/70* (2017.01); *G06T 2207/10028* (2013.01); *G06T 2207/30244* (2013.01); *G06T 2219/008* (2013.01)

(56) References Cited

U.S. PATENT DOCUMENTS

| | | | |
|---|---|---|---|
| 2015/0279087 A1 | 10/2015 | Myers | |
| 2019/0195616 A1 | 6/2019 | Cao et al. | |
| 2021/0120221 A1* | 4/2021 | Li | G06T 7/579 |

FOREIGN PATENT DOCUMENTS

| | | | |
|---|---|---|---|
| CN | 108932475 A | | 12/2018 |
| CN | 109035329 A | | 12/2018 |
| CN | 109872350 A | * | 6/2019 |
| CN | 109872350 A | | 6/2019 |
| CN | 109900338 A | | 6/2019 |
| CN | 109993793 A | | 7/2019 |
| JP | 2011186808 A | | 9/2011 |
| JP | 2019506919 A | | 3/2019 |
| TW | 201514445 A | | 4/2015 |
| TW | 201624326 A | | 7/2016 |

OTHER PUBLICATIONS

English translation of the Written Opinion of the International Search Authority in the international application No. PCT/CN2019/118453, dated Apr. 24, 2020, 5 pgs.

International Search Report in the international application No. PCT/CN2019/118453, dated Apr. 24, 2020, 2 pgs.

First Office Action of the Japanese application No. 2021-574903, dated Feb. 7, 2023, 8 pgs.

* cited by examiner

INFORMATION PROCESSING METHOD AND DEVICE, POSITIONING METHOD AND DEVICE, ELECTRONIC DEVICE AND STORAGE MEDIUM

CROSS-REFERENCE TO RELATED APPLICATIONS

This application is a continuation of International Application No. PCT/CN2019/118453, filed on Nov. 14, 2019, which claims priority to Chinese Patent Application No. 201910690235.0, filed on Jul. 29, 2019. The disclosures of International Application No. PCT/CN2019/118453 and Chinese Patent Application No. 201910690235.0 are hereby incorporated by reference in their entireties.

BACKGROUND

The three-dimensional (3D) reconstruction technique is one of techniques that have emerged in recent years. The technique is widely used in various fields including the industrial field, the medical field, and even daily lives and recreation. The technique may reconstruct a 3D object in a scenario. An image acquired by an image acquiring device such as a camera may be used by the technique to reconstruct a 3D image of the object, so that the object is intuitively displayed in the image.

3D point clouds in the scenario may be generated by the image-based 3D reconstruction. Coordinates of 3D points are usually defined in a coordinate system of an image acquiring device and do not have a real geographical significance. In some practical applications (such as visual positioning), use of these 3D point clouds is of great importance.

SUMMARY

The disclosure relates to the field of computer vision technology, and particularly to, an information processing method and device, a positioning method and device, an electronic device and a storage medium.

A technical solution of information processing and positioning is put forward in the disclosure.

An aspect according to the embodiments of the disclosure provides an information processing method, the method including: obtaining 3D point information of a 3D point cloud; generating, based on the 3D point information, a two-dimensional (2D) point cloud image from projection of the 3D point cloud on a horizontal plane; and determining projection coordinates of 3D points included in the 3D point cloud in a reference coordinate system of a reference plane graph based on a consistency degree that the 2D point cloud image has with the reference plane graph, where the reference plane graph is used for representing a projection graph with reference coordinates that is obtained through the projection of a target object on the horizontal plane, and the 3D point cloud is used for representing 3D space information of the target object.

Another aspect according to the embodiments of the disclosure provides a positioning method, the method including: obtaining target image information of a target object acquired by an image acquiring device; comparing the acquired target image information with 3D points in a 3D point cloud, where the 3D point cloud is used for representing 3D space information of the target object, each 3D point in the 3D point cloud corresponds to projection coordinates, the projection coordinates are determined based on consistency of a 2D point cloud image with a reference plane graph, the 2D point cloud image is generated from projection of the 3D point cloud on a horizontal plane, and the reference plane graph is used for representing a projection image with reference coordinates that is obtained through the projection of the target object on the horizontal plane; and positioning the image acquiring device according to projection coordinates corresponding to one or more 3D points matching the target image information.

Another aspect according to the embodiments of the disclosure provides an information processing device, the device including a memory storing processor-executable instructions and a processor. The processor is configured to execute the stored processor-executable instructions to perform operations of: obtaining 3D point information of a 3D point cloud; generating, based on the 3D point information, a 2D point cloud image from projection of the 3D point cloud on a horizontal plane; and determining projection coordinates of 3D points included in the 3D point cloud in a reference coordinate system of a reference plane graph based on a consistency degree that the 2D point cloud image has with the reference plane graph, where the reference plane graph is used for representing a projection graph with reference coordinates that is obtained through the projection of a target object on the horizontal plane, and the 3D point cloud is used for representing 3D space information of the target object.

Another aspect according to the embodiments of the disclosure provides a positioning device, the device including: an obtaining module, configured to obtain target image information of a target object acquired by an image acquiring device; a comparing module, configured to compare acquired target image information with 3D points in a 3D point cloud, where the 3D point cloud is used for representing 3D space information of the target object, each 3D point in the 3D point cloud corresponds to projection coordinates, the projection coordinates are determined based on consistency of a 2D point cloud image with a reference plane graph, the 2D point cloud image is generated from projection of the 3D point cloud on a horizontal plane, and the reference plane graph is used for representing a projection image with reference coordinates that is obtained through the projection of the target object on the horizontal plane; and a positioning module, configured to position the image acquiring device according to projection coordinates corresponding to one or more 3D points matching the target image information.

Another aspect according to the embodiments of the disclosure provides an electronic device, the electronic device including: a processor; a memory, configured to store instructions executable by the processor, where the processor is configured to: perform the above information processing method.

An aspect according to the embodiments of the disclosure provides a computer-readable storage medium having stored thereon computer program instructions that, when executed by a processor, cause the above information processing method to be performed.

An aspect according to the embodiments of the disclosure provides a computer program including computer-readable code. When the computer-readable code run in an electronic device, a processor in the electronic device performs part of or all of operations described in any of the methods in the first aspect according to the embodiments of the disclosure.

It is to be understood that the above general descriptions and detailed descriptions below are only exemplary and explanatory and not intended to limit the present disclosure.

Other features and aspects of the disclosure will be made clear by detailed descriptions of exemplary embodiments with reference to accompanying drawings below.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
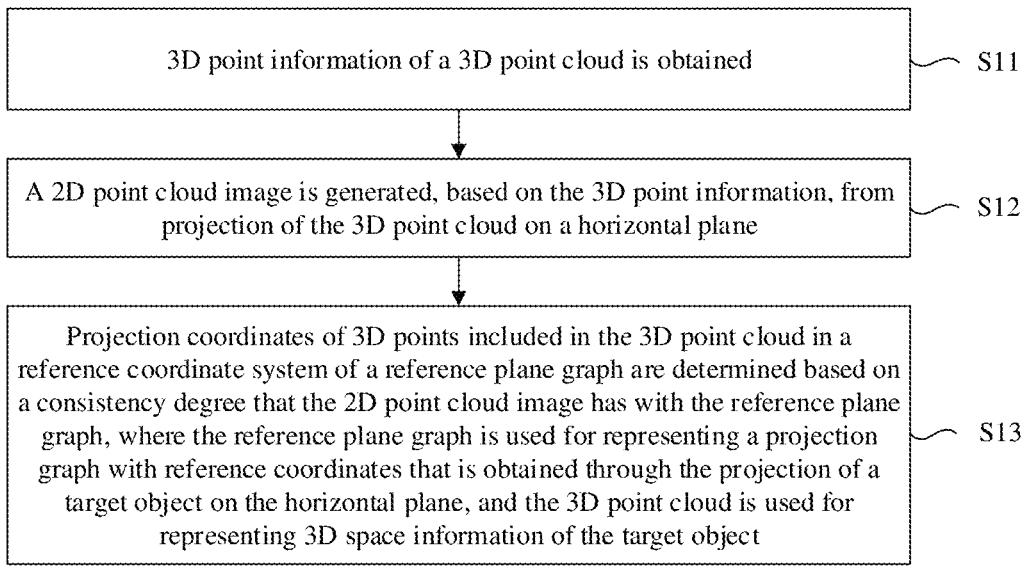
FIG. 1 is a flowchart of an information processing method according to an embodiment of the disclosure.

Various exemplary embodiments, features and aspects of the present disclosure are described in detail below with reference to the accompanying drawings. Elements with same functions or similar elements are represented by a same reference sign in an accompanying drawing. Although each aspect of the embodiments is illustrated in the accompanying drawing, the drawings do not have to be plotted to scale unless specifically indicated. Herein, the specific word "exemplary" means "used as an example or an embodiment, or descriptive". Herein it is not necessary to explain that any embodiment described as "exemplary" is superior to or better than other embodiments. The term "and/or" in the disclosure only represents an association relationship for describing associated objects, and may represent three relationships. For example, A and/or B may represent three conditions: i.e., only A, both A and B, and only B. In addition, herein the term "at least one" represents "any one of many" or "any combination of at least two of many" For example, "including at least one of A, B or C" may represent that "selecting one or more elements from among a set composed of A, B and C". In addition, a great many details are given in the following detailed description to make the disclosure better described. Those skilled in the art should understand the disclosure is also able to be implemented in the absence of some details. In some examples, methods, means, elements and electric circuits familiar to those skilled in the art are not described in detail to make the main idea of the disclosure shown clearly.

In an information processing solution provided in the embodiments of the disclosure, 3D point information of a 3D point cloud is obtained through 3D reconstruction, a 2D point cloud image is generated from the projection of the 3D point cloud on a horizontal plane using the 3D point information of the 3D point cloud and projection coordinates of 3D points included in the 3D point cloud in a reference coordinate system of a reference plane graph are generated based on a consistency degree the generated 2D point cloud image has with the reference plane graph. Therefore, in the solution, coordinates of the 3D point cloud in a coordinate system of an image acquiring device may be converted into reference coordinates in the reference plane graph to automatically match the 3D points included in the 3D point cloud with corresponding positions in the reference plane graph, and to make 2D points, which are formed as a result of projection of the 3D points, aligned with reference points in the reference plane graph that represent a same target object as the 2D points. The reference plane graph is used for representing a projection graph with reference coordinates that is formed through projection of the target object on the horizontal plane, and the 3D point cloud is used for representing 3D space information of the target object.

In relevant techniques, the 3D points in the 3D point cloud are matched with the reference plane graph by hand. For example, during the matching of the 3D point cloud with an indoor map, some visual clues such as a shape, a boundary and a corner are observed with the naked eye, a scale of the 3D point cloud is adjusted manually and the 3D point cloud is subjected to rotation and translation to be aligned with the reference plane graph. However, the method has a low efficiency and is not suitable for a large-scale task because no standards have been established for matching the 3D point cloud by hand and different people performs the task with different accuracies. The information processing solution provided in the embodiments of the disclosure may automatically match the 3D points in the 3D point cloud with the reference plane graph based on the consistency degree that the 2D point cloud image corresponding to the 3D point cloud has with the reference plane graph. Therefore, the solution not only saves people much effort, improves a matching efficiency but also improves an accuracy in matching the 3D point cloud with the reference plane graph.

The information processing solution provided in the embodiments of the disclosure may be applied to a scenario where the 3D points are projected on the plane. For example, a 3D point cloud corresponding to an indoor scenario of a large building is automatically matched with a plane graph of the building. The solution may also be applied to a scenario where the 3D points are used for positioning and navigation. For example, a user may obtain the 3D point information through an image captured by a device such as a cellphone and estimate his position in a scenario where he is, thereby achieving visual positioning. The information processing solution provided in the disclosure is to be described in following embodiments.

FIG. 1 is a flowchart of an information processing method according to an embodiment of the disclosure. The information processing method may be performed by a terminal device, a server or other information processing devices. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device and the like. In some possible implementations, a processor may execute computer-readable instructions stored in a memory to perform the information processing method. The information processing method in the embodiment of the disclosure is to be described with an information processing device taken as an example.

As illustrated in FIG. 1 the information processing method includes following operations S11 to S13.

In operation S11, 3D point information of a 3D point cloud is obtained.

In the embodiment of the disclosure, the information processing device may obtain 3D point cloud formed as a result of 3D reconstruction and obtains the 3D point information of the 3D point cloud. The 3D point cloud may be a 3D point set constituted by multiple 3D points. The 3D points in the set may be obtained through acquisition of image information performed by an image acquiring device in a scenario. The 3D point information of the 3D point cloud may include position information of the 3D points. The position information may be position information of the 3D points in a coordinate system of the image acquiring device that may represent 3D coordinates or 3D vectors in the coordinate system of the image acquiring device. The 3D point cloud may be used for representing information of a 3D space where a target object is located such as information of a 3D space of a scenario where the target object is located. The target object may be any object in the scenario. For example, the target object may be a fixed object such as a wall, a pillar, a desk, a chair, a sign and a building, or a moving object such as a vehicle, a pedestrian.

Herein, the 3D points included in the 3D point cloud may be obtained through the acquisition of image information performed by one or more image acquiring devices. The image acquiring devices captures images of the target object in a scenario from different angles to form the image information that may be used to form the 3D points corresponding to the target object. The 3D points may be used to form the 3D point cloud in the scenario. In a detailed implementation, since the formed 3D points have corresponding coordinates in a 3D space coordinate system, the 3D points of the target object are arranged in the 3D space coordinate system according to their coordinates to form a 3D model, which is the 3D point cloud.

In operation S12, a 2D point cloud image is generated, based on the 3D point information, from projection of the 3D point cloud on a horizontal plane.

In the embodiment of the disclosure, the 3D point cloud may be projected on the horizontal plane based on the obtained 3D point information of the 3D point cloud. Herein, the horizontal plane may be a virtual plane that is determined according to a plane where the image acquiring device captures the images. The 2D point cloud image may be generated from the projection of the 3D point cloud on the horizontal plane.

Herein, before the 2D point cloud image is generated based on the 3D point information from the projection of the 3D point cloud, the plane where the image acquiring device captures the images is determined according to pose information of the image acquiring device and the horizontal plane on which the 3D point cloud is projected on is determined according to the plane where the images are captured. By doing this, the 3D point cloud may be projected on the determined horizontal plane to make the 2D point cloud image of the 3D point cloud come into being. Herein, the horizontal plane may be a plane in the coordinate system of the image acquiring device. The horizontal plane may be same as or different from a horizontal plane in a real 3D space. The 3D point cloud is projected in the coordinate system of the image acquiring device to generate the 2D point cloud image.

Figure 2:
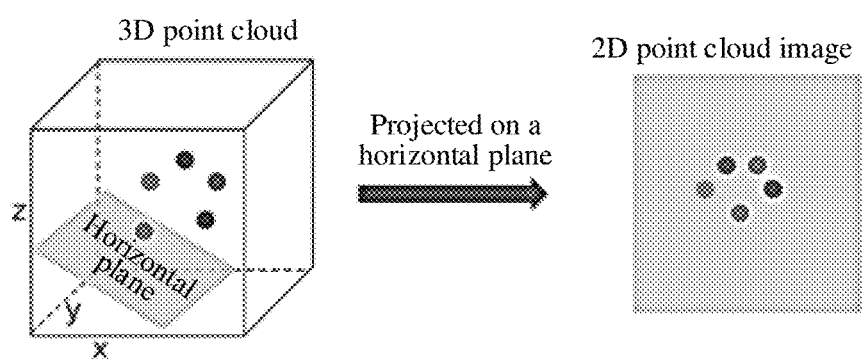
FIG. 2 is a block diagram of a 2D point cloud image generated by projecting a 3D point cloud according to an embodiment of the disclosure.

FIG. 2 is a block diagram of a 2D point cloud image generated by projecting a 3D point cloud according to an embodiment of the disclosure. As illustrated in FIG. 2, the horizontal plane on which the 3D point cloud is projected is not perpendicular to an axis Z in the real 3D space. After the 3D point cloud is projected on the horizontal plane, the 2D point cloud image of the 3D point cloud is obtained.

In operation S13, projection coordinates of 3D points included in the 3D point cloud in a reference coordinate system of a reference plane graph are determined based on a consistency degree that the 2D point cloud image has with the reference plane graph. The reference plane graph is used for representing a projection graph with reference coordinates that is obtained through the projection of a target object on the horizontal plane, and the 3D point cloud is used for representing 3D space information of the target object.

In the embodiment of the disclosure, the consistency degree that the 2D point cloud image has with the reference plane graph may be understood as a mutual consistency degree that 2D points in an image region included in the 2D point cloud image have with reference points in the same image region included in the reference plane graph. A similarity transformation that matches the 2D point cloud image with the reference plane graph may be determined according to the consistency degree that the 2D point cloud image has with the reference plane graph and then the 2D point cloud image may be aligned with the reference plane graph based on the determined similarity transformation to obtain the projection coordinates of the 3D points included in the 3D point cloud in the reference coordinate system of the reference plane graph. Alternatively, a projection transformation that projects the 3D point cloud in the reference coordinate system of the reference plane graph may be determined according to the determined similarity transformation so that a projection image of the 3D point cloud projected in the reference coordinate system of the reference plane graph may be obtained through the projection of the 3D point cloud on the reference plane graph using the projection transformation. Herein, the similarity transformation refers to a transformation relationship for the transformation of the 2D point cloud image into the reference plane graph. Specifically, the similarity transformation that matches the 2D point cloud image with the reference plane graph may include but is not limited to image transformations such as rotation of the 2D point cloud image, translation of the image, resizing of the image. The similarity transformation may matches the 2D point cloud image to corresponding positions in the reference plane graph, and align the 2D points in the 2D point cloud image that represent a target object with the reference points in the reference plane graph that represent the target object.

Herein, the reference plane graph may be a plane graph of the target object projected on the horizontal plane. For example, the reference plane graph may be a plane graph of a building, a 2D map for surveying and mapping or the like. In the embodiment of the disclosure, a conspicuous structure such as a wall, a pillar may be used to automatically match the 3D point cloud with the reference plane graph to reduce the impact of irrelevant information. Herein, the reference plane graph may be a simplified plane graph. In other words, the reference points or reference lines representing the conspicuous structure such as the wall, the pillar may be retained in the reference plane graph. In the reference plane graph, pixel values of the retained reference points or pixel values of the retained reference lines may be set to 1 with pixel values of other pixel points set to 0, thereby simplifying the reference plane graph.

Figure 3:
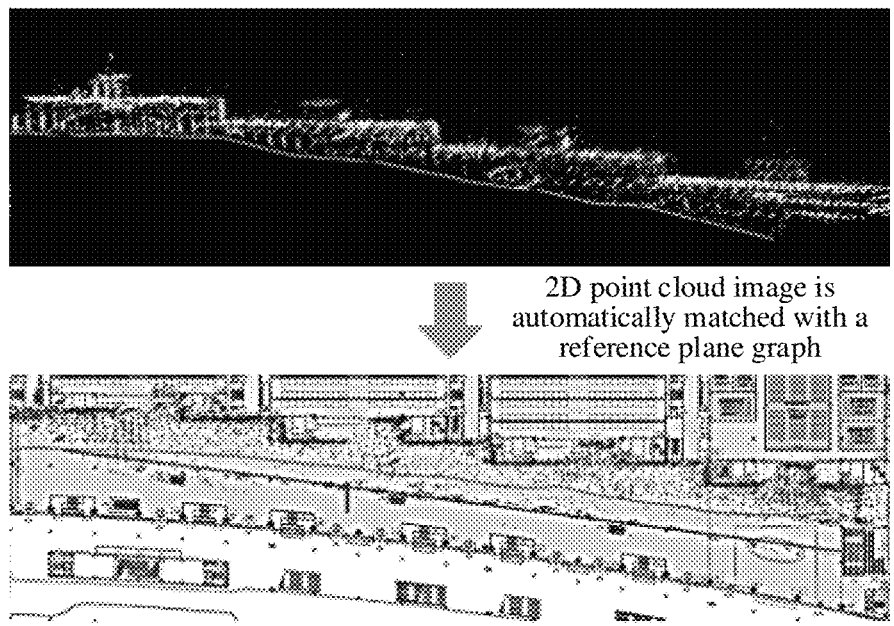
FIG. 3 is a block diagram of a projection image of a 3D point cloud in a reference coordinate system according to an embodiment of the disclosure.

FIG. 3 is a block diagram of a projection image of a 3D point cloud in a reference coordinate system according to an embodiment of the disclosure. As illustrated in FIG. 3, after a 2D point cloud image is obtained through the projection of the 3D point cloud on a horizontal plane, the 2D point cloud image is automatically aligned with a reference plane graph. An information processing solution provided in the embodiment of the disclosure may project the 3D point cloud on the reference plane graph according to a consistency degree that the 2D point cloud image has with the reference plane graph, enable the 3D point cloud in a coordinate system of an image acquiring device to be automatically transformed and put the transformed 3D point cloud in a reference coordinate system of the reference plane graph, thereby saving people much effort and improving a matching efficiency.

A possible implementation of generating a horizontal plane that the 3D point cloud is projected on is provided in the embodiment of the disclosure. The information processing method further includes following operations S121 to S126.

In operation S121, at least two pieces of pose information of the image acquiring during acquisition of image information made by the image acquiring device are obtained. The image information is used for constructing the 3D point cloud.

In operation S122, the horizontal plane that the 3D point cloud is projected on is determined according to the at least two pieces of pose information of the image acquiring device.

In the implementation, since the 3D point cloud is based on the coordinate system of the image acquiring device that may be different from a coordinate system of a real 3D space, the horizontal plane that the 3D point cloud is projected on may be determined firstly. Herein, the coordinate system of the image acquiring device may be a coordinate system that is established on a plane where an image sensor of the image acquiring device is. The coordinate system of the real 3D space may be a world coordinate system. The pose information corresponding to at least two times at which the image acquiring device captures images may be obtained. There may be one piece of pose information at each time. Alternatively, pose information of two image acquiring devices during a period when they capture images may be obtained. Each image acquiring device may have one piece of pose information. The pose information may include position information of the image acquiring device and orientation information of the device. Herein, the position information may be position of the image acquiring device in a coordinate system. A plane where the image acquiring device captures the images may be determined according to the at least two pieces of pose information of the device. The horizontal plane on which the 3D point cloud is projected may be determined according to the plane. Therefore, 3D point information of the 3D point cloud may be projected in a coordinate system of the horizontal plane to generate a 2D point cloud image of the 3D point cloud.

In a possible implementation, operation S122 may include following operations S1221 to S1222.

In operation S1221, a displacement of the image acquiring device between any two positions during its acquisition of the image information is determined according to the at least two pieces of pose information of the image acquiring device.

In operation S1222, the horizontal plane on which the 3D point cloud is projected is determined according to at least two pieces of orientation information of the image acquiring device and the displacement of the image acquiring device between any two positions In this implementation, the horizontal plane on which the 3D point cloud is projected may be considered to be parallel to a horizontal axis of the image acquiring device and be considered to be parallel to a plane where the image acquiring device moves. Therefore, orientations corresponding to the at least two orientation information of the image acquiring device are parallel to the horizontal plane and the displacement determined according to the at least two pieces of position information of the image acquiring device is also parallel to the horizontal plane. In this case, the displacement of the image acquiring device between any two positions during its acquisition of the image information may be determined according to the at least two pieces of position information of the image acquiring device and then the horizontal plane on which the 3D point cloud is projected on may be determined according to a parallel relationship between the horizontal plane and the orientation of the device and a parallel relationship between the horizontal plane and the displacement of the device.

Herein, the image acquiring device meets at least one of following fundamental conditions: a horizontal axis of the image acquiring device during its acquisition of the image information is parallel to the horizontal plane on which the 3D point cloud is projected; a height of the image acquiring device from the ground during its acquisition of the image information changes in a preset height range. The horizontal axis of the image acquiring device during its acquisition of the image information is parallel to the horizontal plane on which the 3D point cloud is projected, which means that the image acquiring device is horizontal when the device captures the image information used for constructing the 3D point cloud. In other words, an x-axis or a y-axis of a coordinate system of the image acquiring device that is determined based on the orientation of the device is parallel to the captured horizontal plane.

Herein, a center of an imaging plane of the image acquiring device may be determined as an origin of the coordinate system of the device, a direction that is perpendicular to the imaging plane of the image acquiring device and crosses the origin may be determined as a z-axis of the coordinate system of the device and any two mutually perpendicular directions on the imaging plane of the image acquiring device may be determined as the x-axis and the y-axis of the coordinate system of device. The fact that the height of the image acquiring device from the ground during its acquisition of the image information changes in the preset height range indicates that the height of the image acquiring device when it acquires the image information may be substantially fixed. Therefore, the displacement of the image acquiring device is parallel to the horizontal plane. The horizontal plane on which the 3D point cloud is projected may be determined according to at least one of the fundamental conditions. In other words, when the horizontal axis of the image acquiring device is parallel to the horizontal plane on which the 3D point cloud is projected, the horizontal plane on which the 3D point cloud is projected may be determined through a plane formed by the horizontal axes of the image acquiring device at at least two moments during acquisition of the image information. Alternatively, when the height of the image acquiring device during its acquisition of the image information changes in the preset height range, the horizontal plane on which the 3D point cloud is projected may be determined through displacement vectors in different directions involved in the acquisition of the image information. Therefore, even if the coordinate system of the image acquiring device where the 3D point cloud is differs from a world coordinate system, the horizontal plane on which the 3D point cloud is projected may be determined quickly, which provides a condition for projecting the 3D point cloud on the horizontal plane to generate the 2D point cloud image.

For example, an x-axis direction of the horizontal plane on which the 3D point cloud is projected may be determined based on the fundamental conditions before a y-axis direction of the horizontal plane and a z-axis direction of the horizontal plane are determined. If A is assumed to be a matrix determined based on the orientation of the image acquiring device, each line of A may represent a transpose of a direction vector of the horizontal x-axis of the image acquiring device at an acquisition moment; if the image acquiring device determines R as a rotation matrix of its pose at the acquisition moment, the direction vector of the x-axis of the image acquiring device at the acquisition moment may be a line vector $(1,0,0)^T$ for a first line of R; if B is assumed to be a matrix obtained based on a displacement of the image acquiring device between two acquisition moments, in order to improve stability, the image acquiring device whose displacement between two acquisition moments are greater than a certain threshold may be taken into consideration. For example, the threshold may be set to be 1 fifth as great as a maximum displacement of the image acquiring device between two acquisition moments so that a small displacement may be filtered out. A linear relationship about a normal vector of the horizontal plane may be established according to the matrices A and B. The relationship is shown in a formula (1):

$$\binom{A}{B} n = 0. \qquad \text{formula (1)}$$

In the formula (1), n is the normal vector of the horizontal plane. The formula (1) may represent that a normal direction of the horizontal plane that is to be solved for is perpendicular to the x-axis of the image acquiring device and perpendicular to the displacement of the image acquiring device.

A least square solution of n may be solved for by the formula (1) through Singular Value Decomposition (SVD). If it is assumed that $$M = \binom{A}{B},$$

after the SVD is performed on M, M may be represented by $M=UDV^T$. U is an m×m unitary matrix, D is an m×3 positive semi-definite diagonal matrix and V is a 3×3 singular vector matrix. A singular vector corresponding to a smallest singular value in V may be a least square solution of n. If singular values are put in a descending order and the singular vectors corresponding to V may be $V_1$, $V_2$ and $V_3$ respectively, then $n=V_3$.

Besides determination of the normal direction of the horizontal plane, the determination of the x-axis direction and the y-axis direction of the horizontal plane can also make it possible to project the 3D point cloud on the horizontal plane to generate the 2D point cloud image. For example, the other two singular vectors in V, namely $V_1$ and $V_2$, may be respectively determined as the direction vector of the x-axis of the horizontal plane on which the 3D point cloud is projected and the direction vector of the y-axis of the horizontal plane.

The above manner may determine the coordinate system where the horizontal plane is and further project the 3D point cloud on the horizontal plane.

In a possible implementation, operations S12 may include operation S123 to S126.

In operation S123, at least one plane included in the 3D point cloud is determined according to the 3D point information of the 3D point cloud.

In operation S124, to-be-filtered-out 3D points are determined according to a number of the 3D points included in each of the at least one plane and a normal direction of each of the at least one plane.

In operation S125, the to-be-filtered-out 3D points are deleted from the 3D point cloud to obtain remaining 3D points of the 3D point cloud.

In operation S126, the remaining 3D points are projected on the horizontal plane according to the 3D point information of the remaining 3D points to generate the 2D point cloud image resulting from the projection of the 3D point cloud on the horizontal plane.

In this implementation, in an indoor scenario, symbolic structures such as a wall, a pillar may be used to match the 3D point cloud with the reference plane graph. Since the 3D point cloud may include 3D points of any number of the target objects in the indoor scenario, if the 3D points in the 3D point cloud are projected on the horizontal plane, the projection of the 3D points corresponding to some non-symbolic structures on the horizontal plane may negatively affect 2D points generated as a result of the projection of the 3D points corresponding to the symbolic structures on the horizontal plane. In this case, identification of the 2D points representing the symbolic structures such as the wall, the pillar may be made more difficult. In order to improve an effect of matching the 2D point cloud image of the 3D point cloud with the reference plane graph, some 3D points in the 3D point cloud may be filtered out during the projection of the 3D point cloud on the horizontal plane. For example, the 3D points in the 3D point cloud that represent objects such as a ceiling, the ground may be filtered out to reduce a number of the 3D points corresponding to many non-symbolic structures. When the 3D points are filtered out from the 3D point cloud, one or more planes formed by the 3D point cloud may be determined according to the position information in the 3D point information and the number of the 3D points included in each of the formed planes is calculated to obtain the normal direction of each of the formed planes. It is generally believed that the planes that the ceiling and the ground are respectively located on include many 3D points and the normal directions of the planes are perpendicular to the ground. Therefore, the planes that the objects including the ceiling, the ground are respectively located on are determined according to the number of the 3D points included in each of the planes and the normal direction of each of the planes, and the 3D points included in the planes that the objects including the ceiling, the ground are respectively located on are determined as the to-be-filtered-out 3D points. The remaining 3D points of the 3D point cloud are obtained after the 3D points on the planes are removed from the 3D point cloud. The remaining 3D points are projected on the horizontal plane according to the position information of the remaining 3D points to generate the 2D point cloud image that is formed as a result of the projection of the 3D point cloud.

In an example of the implementation, operation S124 may include following operations: a first plane with a greatest number of 3D points that is greater than a first threshold is determined from among the at least one plane according to the number of the 3D points included in each of the at least one plane; it is determined whether a normal direction of the first plane is perpendicular to the horizontal plane; and in response to that the normal direction of the first plane is perpendicular to the horizontal plane, the 3D points included in the first plane are determined as the to-be-filtered-out 3D points.

In the example, the first plane with the greatest number of 3D points that is greater than the first threshold is determined from among one or more planes included in the 3D points in the 3D point set according to the number of the 3D points included in each of the obtained planes; then it is determined whether the normal direction of the first plane is perpendicular to the horizontal plane; if the normal direction of the first plane is perpendicular to the horizontal plane, it can be believed that the first plane represents the plane that the ceiling or the ground is located on and the 3D points included in the first plane are the 3D points in the 3D point cloud that are to be filtered out; otherwise, the 3D points on the first plane may be transferred from the 3D point set to a reserved 3D point set to obtain the remaining 3D points in the 3D point set. The operation of determining the first plane with the greatest number of 3D points that is greater than the first threshold from among the one or more planes included in the 3D points in the 3D point set is repeated until the number of the 3D points in the 3D point set is less than or equal to a preset threshold for the number of the remaining 3D points. Herein, the remaining 3D points may be composed of the remaining 3D points in the 3D point set and the 3D points in the reserved 3D point set. The first threshold may be set according to a practical application scenario.

In a possible implementation, operations S12 may include operation S12a to S12d.

In operation S12a, coordinate information of a 2D point cloud obtained through the projection of the 3D point cloud on the horizontal plane is determined according to 3D coordinate vectors of the 3D point cloud and the horizontal plane on which the 3D point cloud is projected.

In operation S12b, a target straight line that meets a straight line condition and that is included in the 2D point cloud is determined according to the coordinate information of the 2D point cloud.

In operation S12c, a rotational angle of the 2D point cloud is determined according to a positional relationship between the target straight line and a coordinate axis of the horizontal plane.

In operation S12d, the 2D point cloud is rotated by the rotational angle to obtain the 2D point cloud image resulting from the projection of the 3D point cloud on the horizontal plane.

In the implementation, the 3D point information may include the 3D coordinate vectors that may be the coordinate vectors in the coordinate system of the image acquiring device. The 3D point cloud is projected on the horizontal plane to generate the 2D point cloud image according to image positions of the symbolic structures in the reference plane graph. For example, the 3D point cloud may be projected on the horizontal plane according to a fact that the symbolic structures in the reference plane graph such as the wall, the pillar are usually parallel to the x-axis or the y-axis of the coordinate system of the reference plane graph. Then the 3D coordinate vector of each 3D point in the 3D point cloud may be projected on the horizontal plane to obtain the coordinate information of the 2D points in the 2D point cloud that are formed as a result of the projection. For example, if a coordinate vector of a 3D point i is $X_i$, coordinates of a 2D point xi obtained through the projection of the 3D point i on the horizontal plane are $(x_i, y_i)$, where $x_i = V_1 \cdot X_i$, and $y_i = V_2 \cdot X_i$. Then, the 2D point cloud is fitted into at least one straight line according to the coordinate information of the 2D point cloud; the target straight line that meets the straight line condition is determined from among the fitted straight lines and the 2D points included in the target straight line meeting the straight line condition are determined as the 2D points representing the symbolic structures. Then an angle between the target straight line and the x-axis of the horizontal plane or angle between the target straight line and the y-axis of the horizontal plane is determined according to the positional relationship between the target straight line and the coordinate axis of the horizontal plane. The angle is determined as the rotational angle of the 2D point cloud. The 2D point cloud is rotated by the rotational angle to make the target straight line parallel to or perpendicular to the x-axis or y-axis of the horizontal plane, so that the 2D point cloud image formed through the projection of the 3D point cloud is finally obtained.

For example, if the rotational angle of the 2D point cloud is assumed to be $r_{ini}$, the 2D point cloud may be rotated through the rotational angle of $r_{ini}$ to make the target straight line parallel to the x-axis of the horizontal plane or the y-axis of the horizontal plane. Extreme values of coordinates of the 2D point cloud are determined according to the coordinate information of the 2D point cloud so that the obtained extreme values of the coordinates of the 2D point cloud may be expressed as $(x_t, y_t)$. A length and a width of a rectangular region where the 2D point cloud is are expressed as w and h. The rectangular region may include at least one 2D point of the 2D point cloud. A size of the rectangular region is increased or decreased by a factor of $s_{ini}$ with the ratio of its length to its width kept unchanged so that the 2D point cloud image in a certain size may be generated. Herein, the size of the 2D point cloud image may be adjusted according to a resolution of the reference plane graph. For example, the length of the 2D point cloud may be set to be equal to a length of a region in the reference plane graph and pixel values at positions where the 2D points in the 2D point cloud image are located may be set to 1 with pixel values at other positions set to 0; in this case the 2D point cloud image formed by the projection of the 3D point cloud may be obtained.

In an example of the implementation, the operation of determining the target straight line that meets the straight line condition and that is included in the 2D point cloud according to the coordinate information of the 2D point cloud may include following operations: at least one straight line included in the 2D point cloud is determined according to the coordinate information of the 2D point cloud; the number of the 2D points included in each of the at least one straight line is calculated and the at least one straight line is ordered according to the number of the 2D points to obtain an ordering result; a current straight line is obtained successively according to the ordering result and among the at least one straight line, a number of the straight lines that are perpendicular to the current straight line is determined; in response to that the number of the straight lines that are perpendicular to the current straight line is greater than a third threshold, the current straight line is determined as the target straight line that meets the straight line condition. The number of 2D points included in each of the at least one straight line is greater than a second threshold; In the example, in the indoor reference plane graph, the conspicuous structure such as the wall, the pillar is usually parallel to x-axis or the y-axis. Based on the above description, the operation of determining the target straight line that meets the straight line condition and that is included in the 2D point cloud may include following operations 1 to 3.

In operation 1, straight-line fitting may be performed on the 2D points in the 2D point set of the 2D point cloud. For example, operation 1 may be performed through a Random Sample Consensus (RANSAC) algorithm. A straight line with a greatest number of 2D points that is greater than a second threshold is obtained and put into a straight line sequence. The 2D points on the straight line are removed from the 2D point set. The greatest number of the 2D points may mean that the number of the 2D points is at a peak.

In operation 2, if the number of the remaining 2D points in the 2D point set is greater than a threshold, operation 1 is repeated. At least one straight line including the 2D points whose number is greater than the second threshold, may be determined through this manner.

In operation 3, the first current straight line is taken away from the straight line sequence according to the calculated number of the 2D points included in each of the at least straight line. The first current straight line may mean that among the at least straight line, the first current straight line has most 2D points. Angles between the current straight line and other straight lines are calculated. If the number of the straight lines that are perpendicular to the current straight line is greater than the third threshold, it can be believed that the current straight line represents a symbolic structure that is parallel to the x-axis or the y-axis and the current straight line is determined as the target straight line that meets the straight line condition; otherwise, operation 3 is repeated until the target straight line that meets the straight line condition is found or the straight line sequence is empty. If the straight line that meets the straight line condition is not found in the straight line sequence, a straight line that is put into the sequence at an earliest time, namely the straight line including most 2D points, may be determined as the target straight line.

A possible implementation for determining the projection coordinates of the 3D points included in the 3D point cloud in the reference coordinate system is also provided in the embodiment of the disclosure. Operation 13 is to be described below and it may include following operation S131 to S134.

In operation S131, at least one similarity transformation is performed on the 2D point cloud image.

In operation S132, a consistency degree that the 2D points in the 2D point cloud image have with reference points in the reference plane graph is determined after the similarity transformation is performed each time.

In operation S133, a transformation relationship of matching the 3D points in the 3D point cloud with the reference points in the reference plane graph is determined according to the consistency degree determined after the at least one similarity transformation is performed.

In operation S134, the 3D point cloud is projected on the reference plane graph based on the transformation relationship to obtain the projection coordinates of the 3D point cloud in the reference coordinate system of the reference plane graph.

In the implementation, since it is possible that the 2D point cloud image and the reference plane graph do not match in terms of their sizes and positions, the at least one similarity transformation needs to be performed on the 2D point could image to align the 2D point cloud image with the an image in the reference plane graph that represents same object as the 2D point cloud image. Herein, the similarity transformations may include rotation, resizing and translation. After the similarity transformation is performed each time, the consistency degree that the 2D points in the 2D point cloud image have with reference points in the reference plane graph may be determined. The similarity transformation that produces a greatest consistency degree may be determined as a final similarity transformation. Since the finally determined similarity transformation is 2D similarity transformation that matches the 2D point cloud image with the reference plane graph, the transformation relationship of matching the 3D points in the 3D point cloud with the reference points in the reference plane graph may be determined according to the finally determined similarity transformation. In other words, the 3D transformation relationship may be determined according to the 2D similarity transformation, and the 3D transformation relationship may match the 3D point cloud with the reference plane graph to obtain the projection coordinates of the 3D point cloud in the reference coordinate system.

In a possible implementation, operation S131 may include following operations S1311 to S1312.

In operation S1311, a transformation range of the similarity transformation performed on the 2D point cloud image is determined.

In operation S1312, the at least one similarity transformation is performed on the 2D point cloud image in the transformation range.

In the implementation, the transformation range of the similarity transformation performed on the 2D point cloud image may be determined first. Herein, the transformation range of the similarity transformation may include a rotational angle, a resizing scale and a translation interval. The similarity transformation may be performed on the 2D point cloud image in the determined transformation range one or more times to match the 2D point cloud image with the reference plane graph.

For example, the 2D point cloud image may be rotated through the rotation angle of $r_{ini}$. The 2D points in the 2D point cloud image that represent the symbolic structures such as the walls are parallel to the x-axis or the y-axis. The reference points in the reference plane graph that represent the symbolic structures such as the walls are also parallel to the x-axis or the y-axis. Therefore, the 2D point cloud image may have 4 rotational angles which may be $\{0°, 90°, 180°, 270°\}$. Transformation at regular intervals may be performed on the resizing scale in [0.55,1.4]. The intervals may be set to 0.05.

The translation interval may be set to be one inside a rectangular region around a center of the reference plane graph. If a translation vector is $(t_x, t_y)$, where $t_x \in$ $$\left[-\frac{w^f}{2} + x_c^f - x_c^p, \frac{w^f}{2} + x_c^f - x_c^p\right] \text{ and } t_y \in \left[-\frac{h^f}{2} + y_c^f - y_c^p, \frac{h^f}{2} + y_c^f - y_c^p\right],$$

a change interval of the translation vector may be 1 pixel. $w^f$ represents a width of the reference plane graph, $h^f$ represents a height of the reference plane graph, $x_c^f$ represents a x-coordinate of the center of the reference plane graph, $y_c^f$ represents a y-coordinate of the center of the reference plane graph, $x_c^p$ represents a x-coordinate of a center of the 2D point cloud image and $y_c^p$ represents a y-coordinate of the center of the 2D point cloud image. The translation interval may be used to move the center of the 2D point cloud image to a rectangular region around the center of the reference plane graph. A size of the rectangular region is equal to that of the reference plane graph.

In a possible implementation, the similarity transformation includes translation transformation. Operation S132 may include following operations: down-sampling processing is performed on the 2D point cloud image for a preset number of times after the 2D point cloud image is subjected to the translation transformation each time, to obtain a first sampled image subjected to the down-sampling processing each time; a consistency degree that 2D points in the first sampled image subjected to the down-sampling processing each time have with reference points in a second sampled image is successively determined, where the second sampled image is obtained after the reference plane graph is subjected to same down-sampling processing as the down-sampling processing to which the first sampled image is subjected; the consistency degree that the 2D points in the 2D point cloud image subjected to the translation transformation each time have with reference points in the reference plane graph is determined according to the consistency degree which the first sampled image has with the second sampled image and which is determined after down-sampling processing is performed for a first time.

In the implementation, in order to improve the efficiency in determining a best similarity transformation, when the translation transformation is performed on the 2D point cloud image, the consistency degree, which the 2D point cloud image subjected to the translation transformation each time has with the reference plane graph, may be determined in a coarse-to-fine manner. In other words, the down-sampling processing may be performed on the 2D point cloud image for the preset number of times after the 2D point cloud image is subjected to the translation transformation each time, so that the first sampled image corresponding to the 2D point cloud image may be obtained after the down-sampling processing is performed each time. In the meantime, the down-sampling processing is performed on the reference plane graph for the preset number of times so that the second sampled image corresponding to the reference plane graph is obtained after the down-sampling processing is performed each time. Multiple first sampled images and the 2D point cloud image together may form an image pyramid that includes multiple layers. A bottom layer may represent the 2D point cloud image and the other layers may represent the first sampled images obtained after the 2D point cloud image is subjected to the down-sampling processing. For example, the other layers represent the first sampled images obtained after a maximum pooling operation is performed on 2D point cloud image. The more layers the image pyramid has, the more times the down-sampling processing corresponding to the first sampled images is performed. Accordingly, multiple second sampled images and the reference plane graph may also form an image pyramid. A bottom layer of the image pyramid may represent the reference plane graph and other layers may represent the second sampled images obtained after the down-sampling processing is performed on the reference plane graph. The image pyramid corresponding to the reference plane graph include same number of layers as the one corresponding to the 2D point cloud image. A consistency degree that the first sampled image on each layer of the image pyramid including the first sampled image has with the second sampled image on the same layer of the image pyramid including the second sampled image is determined successively in an order that starts from their top layers to their bottom layers. In other words, in a descending order according to the number of times of the down-sampling processing, the consistency degree, which the first sampled image has with the second sampled image corresponding to same number of times of the down-sampling processing as the first sampled image, is determined successively. A consistency degree that a position of each pixel point in the first sampled image on each layer of the image pyramid including the first sampled image has with a position of each pixel point in the second sample image on the same layer of the image pyramid including the second sampled image is determined; 20 best candidate positions may be reserved on the layer; the consistency degree that the first sampled image on the next layer in the order has with the second sampled image on the same layer as the first sampled image may be determined in a field adjacent to a position of 7×7 pixel points around the reserved candidate positions. After the above operations have been finished for the bottom layer, the consistency degree that the 2D point cloud image has with the reference plane graph is determined. The manner may improve the efficiency in determining the best similarity transformation.

In a possible implementation, operation S132 may include following operations S1321 to S1325.

In operation S1321, first pixel points in the 2D point cloud image are traversed after the similarity transformation is performed each time on the 2D point cloud image, where the first pixel points are pixel points constituting the 2D points in the 2D point cloud image.

In operation S1322, a first image region in the reference plane graph that corresponds to each first pixel point is determined.

In operation S1323, in response to that one or more second pixel points representing one or more reference points exist in the first image region, the first pixel point is determined as a first target pixel point.

In operation S1324, a first proportion of a number of the first target pixel points included in the 2D point cloud image to a number of first pixel points included in the 2D point cloud image is determined.

In operation S1325, the consistency degree that the 2D point cloud image has with the reference plane graph after the similarity transformation is performed each time, is determined according to the first proportion.

In the implementation, the consistency degree that the 2D point cloud image has with the reference plane graph after the similarity transformation is performed each time may be determined. Herein, the consistency degree may be a consistency degree that an image region included the 2D point cloud image has with the same image region included in the reference plane graph. Thus, the first pixel points in the 2D point cloud image that represent the 2D point are traversed, and an image position of any first pixel point is determined. The first image region is determined at the same image position in the reference plane graph. For example, a field adjacent to the same image position may be determined as the first image region. Then it is determined whether one or more second pixel points representing the reference points exists in the first image region; if yes, the first pixel point is determined as the first target pixel point and the first proportion of the number of the first target pixel points included in the 2D point cloud image to the number of the first pixel points is calculated. The first proportion may be determined as the consistency degree that the 2D point cloud image has with the reference plane graph.

For example, $C_{p2f}$ may be used to represent the consistency degree that the 2D point cloud image has with the reference plane graph. The pixel points in the 2D point cloud image that represent the 2D points may be the first pixel points that may be considered as meaningful pixel points. For example, the pixel values of the first pixel points in the 2D point cloud image may be 1 with the pixel values of other pixel points set to be 0. It is determined whether a pixel point of the reference plant graph, which is at a same image position as each first pixel point in the 2D point cloud image, is a second pixel point; if yes, the first pixel point is the first target pixel point. The first proportion of the number of the first target pixel points to the number of the first pixel points is determined. In order to improve fault tolerance, the same position involved in the above operations may be replaced by an adjacent position. For example, the adjacent position may be set to be a field adjacent to 7×7 pixel points.

In a possible implementation, operation S132 may include following operations: second pixel points in the reference plane graph are traversed after the similarity transformation is performed each time on the 2D point cloud image, where the second pixel points are pixel points constituting the reference points in the reference plane graph; a second image region in the 2D point cloud image that corresponds to each second pixel point is determined; in response to that one or more first pixel points representing one or more 2D points exist in the second image region, the second pixel point is determined as a second target pixel point; a second proportion of a number of the second target pixel points included in the reference plane graph to a number of the second pixel points included in the reference plane graph is determined; the consistency degree that the 2D point cloud image has with the reference plane graph after the similarity transformation is performed each time, is determined according to the second proportion.

In the implementation, the consistency degree that the 2D point cloud image has with the reference plane graph may be a consistency degree that an image area included in the reference plane graph has with the same image area included in the 2D point cloud image. Thus, the second pixel points in the reference plane graph that represent the 2D point may be traversed, and an image position of any second pixel point is determined. The second image area is determined at the same image position in the 2D point cloud image. For example, a field adjacent to the same image position may be determined as the second image area. Then it is determined whether one or more first pixel points representing the 2D points exists in the second image area; if yes, the second pixel point is determined as the second target pixel point and the second proportion of the number of the second target pixel points included in the reference plane graph to the number of the second pixel points included in the reference plane graph is calculated. The second proportion may represent the consistency degree that the reference plane graph has with the 2D point cloud image. Accordingly, $C_{p2p}$ may be used to represent the consistency degree that the reference plane graph has with the 2D point cloud image. In some implementations, $C_{p2p}+C_{f2p}$ may be used to represent the mutual consistency degree that the 2D point cloud image has with the reference plane graph. The greater the consistency degree is, the better the 2D point cloud image is aligned with the reference plane graph.

In a possible implementation, operation S132 may include following operations S132a to S132c.

In operation S132a, one or more first pixel points in a non-enclosed region of the 2D point cloud image are determined after the similarity transformation is performed each time on the 2D point cloud image. The first pixel points are pixel points constituting the 2D points in the 2D point cloud image.

In operation S132b, a third proportion of a number of the first pixel points in the non-enclosed region to a number of the first pixel points included in the 2D point cloud image is determined.

In operation S132c, the consistency degree that the 2D point cloud image has with the reference plane graph after the similarity transformation is performed each time is determined according to the third proportion.

In the implementation, in order to improve robustness of the projection of the 3D point cloud in the reference coordinate system, when the consistency degree that the 2D point cloud image has with the reference plane graph is determined, a constraint that the 3D point cloud is not allowed to be projected in some regions may be taken into consideration. In other words, these regions such as some enclosed image spaces are off-limits to the 3D points in the 3D point cloud. Accordingly, the 2D points formed as a result of the projection of the 3D points should not appear in some image regions. Therefore, the number of the first pixel points in the non-enclosed region in the 2D point cloud image is calculated, and then the third proportion of the number of the first pixel points in the non-enclosed region to the number of the first pixel points included in the 2D point cloud image is determined. The third proportion may represent the consistency degree that the 2D point cloud image has with the reference plane graph.

In a possible implementation, operation S132 may further include following operations: third pixel points obtained through the projection of the image acquiring device in the 2D point cloud image are determined according to the pose information of the image acquiring device during the acquisition of the image information after the similarity transformation is performed each time on the 2D point cloud image, where the image information is used for constructing the 3D point cloud; a fourth proportion of a number of the third pixel points in the non-enclosed region to a number of the third pixel points included in the 2D point cloud image is determined; the consistency degree that the 2D point cloud image has with the reference plane graph after the similarity transformation is performed each time, is determined according to the fourth proportion.

In the implementation, when the consistency degree that the 2D point cloud image has with the reference plane graph is determined, a constraint for the acquisition of the image information performed by the image acquiring device may also be taken into consideration. The constraint is that the image acquiring device should not appear in some spaces such as some enclosed spaces when the device is acquiring the image information. Accordingly, 2D points formed by the projection of the image acquiring device in the 2D point cloud image should not appear in some regions. Therefore, the third pixel points obtained through the projection of the image acquiring device in the 2D point cloud image may be determined according to the pose information of the image acquiring device involved in the acquisition of the image information by the image acquiring device and the number of the third pixel points in the non-enclosed region is calculated. The fourth proportion of a number of the third pixel points in a non-enclosed region to the number of the third pixel points included in the 2D point cloud image is calculated. The fourth proportion may represent the consistency degree that the 2D point cloud image has with the reference plane graph.

In some implementations, one or more of the first proportion, the second proportion, the third proportion, and the fourth proportion may be used to determine the consistency degree that the 2D point cloud image has with the reference plane graph more fully. The greater the consistency degree is, the better the 2D point cloud image is aligned with the reference plane graph. Based on each of the above implementations, in an example, the consistency degree, which the 2D point cloud image has with the reference plane graph after the similarity transformation is performed each time, may be determined based on all of the first proportion, the second proportion, the third proportion, and the fourth proportion. Accordingly, an expression for the consistency degree may be expressed in a formula (2):

$C = C_{p2f} + C_{p2p} + C_{lc} + C_{lp}$ formula (2), where C may be the consistency degree that the 2D point cloud image has with the reference plane graph. The greater the consistency degree is, the better the 2D point cloud image is aligned with the reference plane graph. $C_{p2f}$ may represent the first proportion, $C_{p2p}$ may represent the second proportion, $C_{lc}$ may represent the third proportion, and $C_{lp}$ may represent the fourth proportion.

In a possible implementation, operation S133 may include following operations S1331 to S1332.

In operation S1331, a 2D transformation matrix for matching the 2D points in the 2D point cloud image with the reference points in the reference plane graph is determined according to the consistency degree determined after the at least one similarity transformation is performed.

In operation S1332, the transformation relationship of matching the 3D points in the 3D point cloud with the reference points in the reference plane graph is determined based on the 2D transformation matrix.

In this possible implementation, one of the at least one similarity transformation that brings a greatest consistency degree may be determined as a final similarity transformation and the 2D transformation matrix for matching the 2D point cloud image with the reference plane graph may be determined according to the final similarity transformation. Then the transformation relationship of matching the 3D points in the 3D point cloud with the reference points in the reference plane graph may be obtained based on the 2D transformation matrix. The transformation relationship may be represented by a 3D transformation matrix. For example, a rotational angle corresponding to the similarity transformation that brings the greatest consistency degree may be $r_{best}$ and the resizing scale corresponding to the similarity transformation may be $s_{best}$. $r_{best}$ may include an initial rotational angle $r_{ini}$ and $s_{best}$ may include an initial resizing scale $s_{ini}$. Best translation for the rotational angle and the resizing scale may be $t_{best}$. Therefore, the 2D transformation matrix of the similarity transformation of the 2D points in the 2D point cloud image into the reference points in the reference plane graph may be obtained. The 2D transformation matrix $S_{2D}$ may be expressed in a formula (3):

$$S_{2D} = \begin{bmatrix} s_{best} R(r_{best}) & t_{best} \\ 0^T & 1 \end{bmatrix}, \quad \text{formula (3)}$$

where $R(r_{best})$ may represent a 2×2 rotation matrix with a rotational angle equal to $r_{best}$ After the 2D similar matrix is obtained, the 3D transformation matrix may be obtained according to the 2D similar matrix. The 3D transformation matrix $S_{3D}$ may be expressed in a formula (4):

$$S_{3D} = \begin{bmatrix} s_{best} R_z(r_{best}) V^T & t_{best} \\ & 0 \\ 0^T & 1 \end{bmatrix}. \quad \text{formula (4)}$$

$R_z(r_{best})$ may represent the 3D rotation matrix for rotation around a z-axis through a degree of $r_{best}$, V may be a singular vector matrix in operation S1222. Three column vectors $V_1$, $V_2$ and $V_3$ may be the x-axis, y-axis and z-axis of the horizontal plane for the projection.

The 3D transformation matrix makes it possible to obtain the projection coordinates of any 3D point of the 3D point cloud in the reference plane graph according to the 3D point information of the 3D point cloud and improves the efficiency and the accuracy in matching the 3D point cloud with the reference plane graph.

Figure 4:
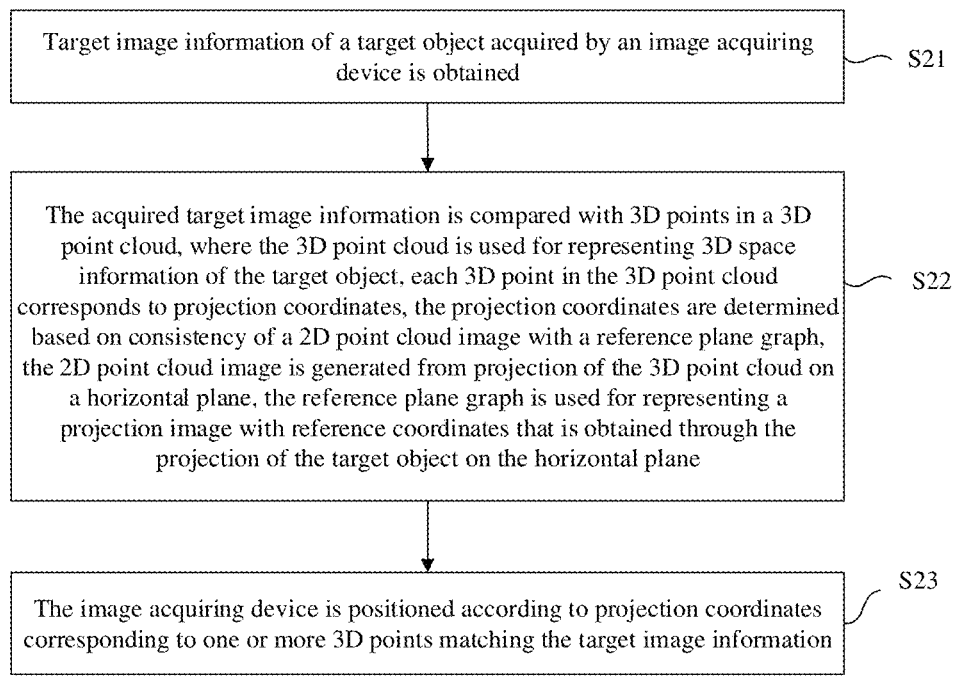
FIG. 4 is a flowchart of a positioning method according to an embodiment of the disclosure.

Based on the information processing method provided in the embodiment of the disclosure, a positioning method is further provided in the embodiment of the disclosure. FIG. 4 is a flowchart of the positioning method according to the embodiment of the disclosure. The positioning method may be performed by a terminal device, a server or other information processing device. The terminal device may be UE, a mobile device, a user terminal, a terminal, a cellular phone, a cordless phone, a PDA, a handheld device, a computing device, a vehicle-mounted device, a wearable device or the like. In some possible implementations, a processor may execute computer-readable instructions stored in a memory to perform the positioning method.

As illustrated in FIG. 4, the positioning method includes following operations S21 to S23.

In operation S21, target image information of a target object acquired by an image acquiring device is obtained.

In operation S22, the acquired target image information is compared with 3D points in a 3D point cloud. The 3D point cloud is used for representing 3D space information of the target object. Each 3D point in the 3D point cloud corresponds to projection coordinates. The projection coordinates are determined based on consistency of a 2D point cloud image with a reference plane graph. The 2D point cloud image is generated from the projection of the 3D point cloud on a horizontal plane. The reference plane graph is used for representing a projection image with reference coordinates that is obtained through the projection of the target object on the horizontal plane.

In operation S23, the image acquiring device is positioned according to projection coordinates corresponding to one or more 3D points matching the target image information.

In the embodiment of the disclosure, a positioning device may obtain the target image information of the target object that the image acquiring device acquires in a current scenario and may compare the acquired target image with the 3D points in the 3D point cloud in the current scenario to determine the 3D points matching the acquired target image information. The positioning device may determine the projection coordinates of the determined 3D points in a reference plane graph according to the 3D point information of the determined 3D points. For example, the positioning device determines the projection coordinates of the determined 3D points in the reference plane graph according to the 3D projection matrix. The positioning may determine a position of the image acquiring device in the current scenario according to the projection coordinates of the 3D points. For example, a user may use the image acquiring device to capture pictures of the target object so that the positioning device may determine a position of the user in a reference plane graph in the current scenario to position the user according to the target image information captured by the image acquiring device.

It can be understood that all above the method embodiments of the disclosure may combine with each other to form a combined embodiment without departing from the principles and the logics. Due to a limited space, the details will not be given in the disclosure.

In addition, an information processing device, an electronic device, a computer-readable storage medium, a program are further provided in the disclosure. Any one of the devices, the medium, and the program may be used for implementing any information processing method provided in the disclosure. The description of the methods may be referred to for their technical solutions and descriptions.

In the information processing solution provided in the embodiment of the disclosure, the 3D point cloud may be projected on the reference plane graph according to a consistency degree that a 2D point cloud image has with the reference plane graph. The solution makes the 3D point cloud in a coordinate system of the image acquiring device automatically transformed into the 2D point cloud image in a reference coordinate system of the reference plane graph, saving people lots of efforts and improving a matching efficiency. A manner combining pre-processing that filters some 3D points from the 3D point cloud and multiple constraints is adopted in the solution to implement automatic matching and registration, thereby improving the accuracy in the matching. When it comes to a scenario in a large building, firstly images of the scenario may be acquired and be subjected to 3D reconstruction, and then the information processing solution provided in the embodiment of the disclosure may be used to automatically match the 3D point cloud, which is obtained through the 3D reconstruction, with a plane graph of the building. Finally based on a projection image obtained after the matching, the user may capture the images using a device such as a cellphone to estimate its position in the plane graph of the building, namely its position in the current scenario, to implement the visual positioning.

Those skilled in the art may understand that in the above methods in the detailed descriptions, an order in which all operations are written does not mean a strict order in which they are performed and do not bring any limitation on their implementation processes. The order in which the operations are performed should be determined by their functions and possible internal logics.

Figure 5:
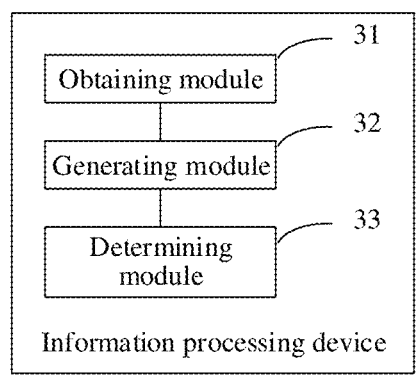
FIG. 5 is a block diagram of an information processing device according to an embodiment of the disclosure.

FIG. 5 is a block diagram of an information processing device according to an embodiment of the disclosure. As illustrated in FIG. 5, the information processing device includes an obtaining module 31, a generating module 32 and a determining module 33.

The obtaining module 31 is configured to obtain 3D point information of a 3D point cloud. The generating module 32 is configured to generate, based on the 3D point information, a 2D point cloud image from projection of the 3D point cloud on a horizontal plane. The determining module 33 is configured to determine projection coordinates of 3D points included in the 3D point cloud in a reference coordinate system of a reference plane graph based on a consistency degree that the 2D point cloud image has with the reference plane graph. The reference plane graph is used for representing a projection graph with reference coordinates that is obtained through the projection of a target object on the horizontal plane, and the 3D point cloud is used for representing 3D space information of the target object.

Figure 6:
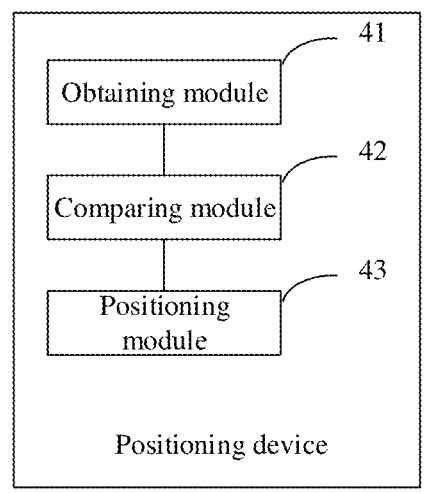
FIG. 6 is a block diagram of an example of a positioning device according to an embodiment of the disclosure.

FIG. 6 is a block diagram of a positioning device according to an embodiment of the disclosure. The positioning device includes an obtaining module 41, a comparing module 42 and a positioning module 43. The obtaining module 41 is configured to obtain target image information of a target object acquired by an image acquiring device. The comparing module 42 is configured to compare the acquired target image information with 3D points in a 3D point cloud. The 3D point cloud is used for representing 3D space information of the target object. Each 3D point in the 3D point cloud corresponds to projection coordinates. The projection coordinates are determined based on consistency of a 2D point cloud image with a reference plane graph. The 2D point cloud image is generated from projection of the 3D point cloud on a horizontal plane. The reference plane graph is used for representing a projection image with reference coordinates that is obtained through the projection of the target object on the horizontal plane. The positioning module 43 is configured to position the image acquiring device according to projection coordinates corresponding to one or more 3D points matching the target image information.

Functions or modules included in the device provided in some embodiments of the disclosure may be used for performing the method described in the above method embodiments. The descriptions of the above method embodiments may be referred to for the detailed implementation of device, which are not elaborated herein for the sake of brevity.

An electronic device is also provided in an embodiment of the disclosure. The electronic device includes a processer and a memory used for storing instructions executable by the processor. The processor is configured to perform the above method.

The electronic device may be provided as a terminal, a server or devices in other forms.

Figure 7:
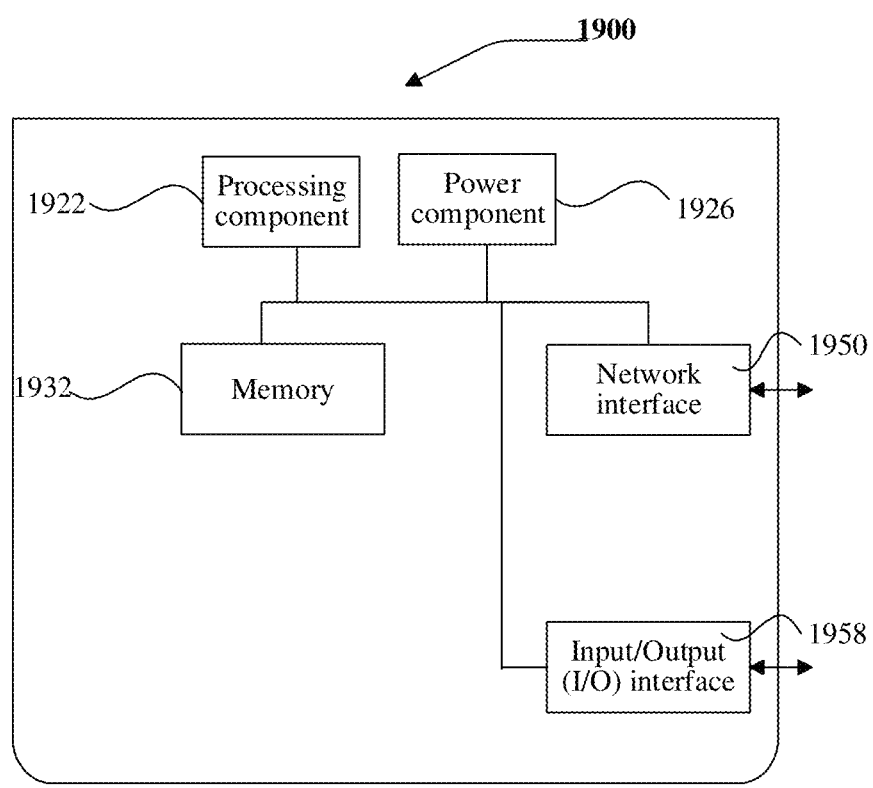
FIG. 7 is a block diagram of an example of an electronic device according to an embodiment of the disclosure.

FIG. 7 is a block diagram of an electronic device 1900 according to an exemplary embodiment of the disclosure. For example, the electronic device 1900 may be provided as a server. As illustrated in FIG. 7, the electronic device 1900 includes a processing component 1922, which further includes one or more processors, and a memory resource which is represented by a memory 1932 and used for storing instructions (such as application programs) executable by the processing component 1922. The application programs stored in the memory 1932 may include one or more modules, each of which corresponds to a group of instructions. Moreover, the processing component 1922 is configured to execute the instructions to perform the above methods.

The electronic device 1900 may further include a power component 1926 configured to conduct power management of the electronic device 1900, a wired or wireless network interface 1950 configured to connect the electronic device 1900 to a network, and an Input/Output (I/O) interface 1958. The electronic device 1900 may operate based on an operation system stored in the memory 1932, such as Windows Server™, Mac OS X™, Unix™, Linux™, FreeBSD™ and the like.

In an exemplary embodiment, there is also provided a non-transitory computer-readable storage medium such as the memory 1932 including computer program instructions, and the computer program instructions may be executed by the processing component 1922 of the electronic device 1900 to implement the above methods.

The embodiment of the disclosure may be a system, a method and/or a computer program product. The computer program product may include the computer-readable storage medium which is loaded with the computer-readable program instructions used for enabling a processor to implement each aspect of the disclosure.

The computer-readable storage medium may be a tangible device that can keep and store instructions used by an instruction-executing device. The computer-readable storage medium may be but is not limited to, for example, an electric storage device, a magnetic storage device, an optical storage device, an electromagnetic storage device, a semiconductor storage device or any suitable combination of the aforementioned devices. More specific examples (an non-exhaustive list) of the computer-readable storage medium include: a portable computer disk, a hard disk, a Random Access Memory (RAM), a Read-Only Memory (ROM), an EPROM (or a flash memory), a Static Random Access Memory (SRAM), a Compact Disc Read-Only Memory (CD-ROM), a Digital Video Disk (DVD), a memory stick, a floppy disk, a mechanical encoding device, a punched card where instructions are stored or a protruding structure in a groove or any suitable combination thereof. The computer-readable storage medium used herein is not described as an instant signal such as a radio wave, other electromagnetic waves propagating freely, an electromagnetic wave propagating through a wave guide or other transmission media such as an optical pulse passing through a fiber-optic cable or an electric signal transmitting through electric wires.

The computer-readable program instructions described herein may be downloaded onto each computing or processing device from the computer-readable storage medium or onto an external computer or an external storage device through a network such as the Internet, a Local Area Network (LAN), a Wide Area Network (WAN) and/or a wireless network. The network may include a copper-transmitted cable, fiber-optic transmission, wireless transmission, a router, a firewall, a switch, a gateway computer and/or an edge server. A network adapter card or a network interface in each computing/processing device receives the computer-readable program instructions from the network and relays the computer-readable program instructions so that the computer-readable program instructions are stored in the computer-readable storage medium in each computing/processing device.

The computer program instructions used for performing the operations of the disclosure may be assembly instructions, Instruction Set Architecture (ISA) instructions, machine instructions, machine-related instructions, micro-codes, firmware instructions, state-setting data, source codes or target codes that are written in one programming language or any combination of several programming languages. The programming languages include object-oriented languages such as Smalltalk, C++, conventional procedure-oriented languages such as a "C" language or similar programming languages. The computer-readable program instructions can be completely or partially executed on a user computer, or executed as a separate software package. The computer-readable program instructions may also be partially executed on the user computer with the remaining executed on the remote computer, or completely executed on the remote computer or a server. In the case of the remote computer, the remote computer may connect to the user computer through any kind of network that includes the LAN and the WAN, or may connect to the external computer (for example, the remote computer may make the connection through the Internet with the help of an Internet service provider). In some embodiments, state information of the computer-readable program instructions is adopted to personalize an electric circuit such as a programmable logic circuit, a Field Programmable Gate Array (FPGA) and a Programmable Logic Array (PLA). The electric circuit may execute the computer-readable program instructions to implement each aspect of the disclosure.

Each aspect of the disclosure is described herein with reference to the flowcharts and block diagrams of the method, the device (the system) and the computer program product according to the embodiments of the disclosure. It should be understood that each block in the flowcharts and/or the block diagrams and combinations of each block in the flowcharts and/or the block diagrams may be implemented by the computer-readable program instructions.

The computer-readable program instructions may be provided to the processor of a general-purpose computer, a specific-purpose computer or another programmable data-processing device to produce a machine so that these instructions produce a device that implements functions/actions specified in one or more blocks in the flowcharts and/or the block diagrams, when executed through the processor of the computer or another programmable data-processing device. The computer-readable program instructions may also be stored in the computer-readable storage medium to make the computer, the programmable data-processing device and/or other devices to work in a specific manner. In this case, the computer-readable medium where the instructions are stored include a manufactured product that includes the instructions for implementing each aspect of the functions/the actions specified in one or more blocks in the flowcharts and/or the block diagrams.

The computer-readable program instructions may also be loaded on the computer, other programmable data-processing devices or other devices to make a series of operations performed on the computer, other programmable data-processing devices or other devices and establish procedures implemented by the computer so that the instructions executed in the computer, other programmable data-processing devices, or other devices implement the functions/the actions in one or more blocks of flowcharts and/or the block diagrams.

The flowcharts and the block diagrams in the accompanying drawings illustrate systems, architectures, functions and operations that are possibly implemented by the system, method and the computer program product according to the multiple embodiments of the disclosure. At this point, each block in the flowcharts or the block diagrams may represent a module, a program segment or a part of the instructions. The module, the program segment or the part of the instructions include one or more executable instructions used for implementing specified logical functions. In some implementations that serve as substitutes, the annotated functions in the block may also happen in an order different from the annotated order in the accompanying drawings. For example, depending on the relevant functions, two adjacent blocks actually may be basically executed in parallel or sometimes in opposite orders. It should also be noted that each block or a combination of the blocks in the block diagrams and/or the flowcharts may be implemented by a specific hardware-based system for performing specified functions or actions or be implemented by a combination of specific hardware and computer instructions.

Each embodiment of the disclosure has been described above. The above descriptions are not exhaustive but exemplary and are also not limited to each of the disclosed embodiments. Many changes and modifications are apparent to those of ordinary skills in the art without departing from the scope and the spirit of each of the described embodiments. The terminology used herein is chosen to best explain the principles, the practical applications or the improvement of the technologies in the market mentioned in each embodiment or enable others of ordinary skills in the art to understand each embodiment disclosed herein.

The invention claimed is:
1. An information processing method, comprising:
obtaining three-dimensional (3D) point information of a 3D point cloud;
generating, based on the 3D point information, a two-dimensional (2D) point cloud image from projection of the 3D point cloud on a horizontal plane; and determining projection coordinates of 3D points comprised in the 3D point cloud in a reference coordinate system of a reference plane graph based on a consistency degree that the 2D point cloud image has with the reference plane graph, wherein the reference plane graph is used for representing a projection graph with reference coordinates that is obtained through projection of a target object on the horizontal plane, and the 3D point cloud is used for representing 3D space information of the target object, wherein generating, based on the 3D point information, the 2D point cloud image from the projection of the 3D point cloud on the horizontal plane comprises:
  determining at least one plane comprised in the 3D point cloud according to the 3D point information of the 3D point cloud;
  determining to-be-filtered-out 3D points according to a number of the 3D points comprised in each of the at least one plane and a normal direction of each of the at least one plane;
  deleting the to-be-filtered-out 3D points from the 3D point cloud to obtain remaining 3D points of the 3D point cloud; and
  projecting the remaining 3D points on the horizontal plane according to the 3D point information of the remaining 3D points to generate the 2D point cloud image resulting from the projection of the 3D point cloud on the horizontal plane.

2. The method of claim 1, further comprising: before generating, based on the 3D point information, the 2D point cloud image from the projection of the 3D point cloud on the horizontal plane,
  obtaining at least two pieces of pose information of an image acquiring device during acquisition of image information, wherein the image information is used for constructing the 3D point cloud; and
  determining, according to the at least two pieces of pose information of the image acquiring device, the horizontal plane on which the 3D point cloud is projected.

3. The method of claim 2, wherein the pose information comprises orientation information and position information,
  wherein determining, according to the at least two pieces of pose information of the image acquiring device, the horizontal plane on which the 3D point cloud is projected comprises:
    determining, according to the at least two pieces of pose information of the image acquiring device, a displacement of the image acquiring device between any two positions during the acquisition of the image information; and
    determining, according to at least two pieces of orientation information of the image acquiring device and the displacement of the image acquiring device between any two positions, the horizontal plane on which the 3D point cloud is projected.

4. The method of claim 2, wherein the image acquiring device meets at least one of following preset fundamental conditions:
  a horizontal axis of the image acquiring device during the acquisition of the image information is parallel to the horizontal plane on which the 3D point cloud is projected; and
  a height of the image acquiring device from a ground during the acquisition of the image information changes in a preset height range.

5. The method of claim 2, wherein the 3D point information comprises 3D coordinate vectors, and generating, based on the 3D point information, the 2D point cloud image from the projection of the 3D point cloud on the horizontal plane further comprises:
  determining coordinate information of a 2D point cloud obtained through the projection of the 3D point cloud on the horizontal plane, according to the 3D coordinate vectors of the 3D point cloud and the horizontal plane on which the 3D point cloud is projected;
  determining a target straight line that meets a straight line condition and that is comprised in the 2D point cloud according to the coordinate information of the 2D point cloud;
  determining a rotational angle of the 2D point cloud according to a positional relationship between the target straight line and a coordinate axis of the horizontal plane; and
  rotating the 2D point cloud by the rotational angle to obtain the 2D point cloud image resulting from the projection of the 3D point cloud on the horizontal plane.

6. The method of claim 5, wherein determining the target straight line that meets the straight line condition and that is comprised in the 2D point cloud according to the coordinate information of the 2D point cloud comprises:
  determining at least one straight line comprised in the 2D point cloud according to the coordinate information of the 2D point cloud, wherein a number of 2D points comprised in each of the at least one straight line is greater than a second threshold;
  calculating the number of the 2D points comprised in each of the at least one straight line and ordering the at least one straight line according to the number of the 2D points to obtain an ordering result;
  obtaining a current straight line successively from among the at least one straight line according to the ordering result and determining a number of straight lines that are perpendicular to the current straight line from among the at least one straight line; and
  in response to the number of the straight lines that are perpendicular to the current straight line being greater than a third threshold, determining the current straight line as the target straight line that meets the straight line condition.

7. The method of claim 1, wherein determining the to-be-filtered-out 3D points according to the number of the 3D points comprised in each of the at least one plane and the normal direction of each of the at least one plane comprises:
  determining, a first plane with a greatest number of 3D points that is greater than a first threshold, from among the at least one plane according to the number of the 3D points comprised in each of the at least one plane;
  determining whether a normal direction of the first plane is perpendicular to the horizontal plane; and
  in response to the normal direction of the first plane being perpendicular to the horizontal plane, determining the 3D points comprised in the first plane as the to-be-filtered-out 3D points.

8. The method of claim 1, wherein determining the projection coordinates of the 3D points comprised in the 3D point cloud in the reference coordinate system of the reference plane graph based on the consistency degree that the 2D point cloud image has with the reference plane graph comprises:
  performing at least one similarity transformation on the 2D point cloud image;
  determining a consistency degree that 2D points in the 2D point cloud image have with reference points in the reference plane graph after the at least one similarity transformation is performed each time;

determining, according to the consistency degree determined after the at least one similarity transformation is performed, a transformation relationship of matching the 3D points in the 3D point cloud with the reference points in the reference plane graph; and projecting the 3D point cloud on the reference plane graph based on the transformation relationship to obtain the projection coordinates of the 3D point cloud in the reference coordinate system of the reference plane graph.

9. The method of claim 8, wherein performing the at least one similarity transformation on the 2D point cloud image comprises:

determining a transformation range of the at least one similarity transformation performed on the 2D point cloud image; and performing the at least one similarity transformation on the 2D point cloud image in the transformation range.

10. The method of claim 8, wherein each of the at least one similarity transformation comprises translation transformation, and determining the consistency degree that the 2D points in the 2D point cloud image have with the reference points in the reference plane graph after the at least one similarity transformation is performed each time comprises:

performing down-sampling processing on the 2D point cloud image for a preset number of times after the 2D point cloud image is subjected to the translation transformation each time to obtain a first sampled image subjected to the down-sampling processing each time;

determining a consistency degree that 2D points in the first sampled image subjected to the down-sampling processing each time have with reference points in a second sampled image, wherein the second sampled image is obtained after the reference plane graph is subjected to same down-sampling processing as the down-sampling processing to which the first sampled image is subjected; and determining, according to the consistency degree which the first sampled image has with the second sampled image and which is determined after down-sampling processing is performed for a first time, the consistency degree that the 2D points in the 2D point cloud image subjected to the translation transformation each time have with the reference points in the reference plane graph.

11. The method of claim 8, wherein determining the consistency degree that the 2D points in the 2D point cloud image have with the reference points in the reference plane graph after the at least one similarity transformation is performed each time comprises:

traversing first pixel points in the 2D point cloud image after the at least one similarity transformation is performed each time on the 2D point cloud image, wherein the first pixel points are pixel points constituting the 2D points in the 2D point cloud image;

determining a first image region in the reference plane graph that corresponds to each first pixel point;

in response to one or more second pixel points representing one or more reference points existing in the first image region, determining the first pixel point as a first target pixel point;

determining a first proportion of a number of the first target pixel points comprised in the 2D point cloud image to a number of the first pixel points comprised in the 2D point cloud image; and determining, according to the first proportion, the consistency degree that the 2D point cloud image has with the reference plane graph after the at least one similarity transformation is performed each time.

12. The method of claim 8, wherein determining the consistency degree that the 2D points in the 2D point cloud image have with the reference points in the reference plane graph after the at least one similarity transformation is performed each time comprises:

traversing second pixel points in the reference plane graph after the at least one similarity transformation is performed each time on the 2D point cloud image, wherein the second pixel points are pixel points constituting the reference points in the reference plane graph;

determining a second image region in the 2D point cloud image that corresponds to each second pixel point of the second pixel points;

in response to one or more first pixel points representing one or more 2D points existing in the second image region, determining the second pixel point as a second target pixel point;

determining a second proportion of a number of the second target pixel points comprised in the reference plane graph to a number of the second pixel points comprised in the reference plane graph; and determining, according to the second proportion, the consistency degree that the 2D point cloud image has with the reference plane graph after the at least one similarity transformation is performed each time, or wherein determining the consistency degree that the 2D points in the 2D point cloud image have with reference points in the reference plane graph after the similarity transformation is performed each time comprises:

determining one or more first pixel points in a non-enclosed region of the 2D point cloud image after the at least one similarity transformation is performed each time on the 2D point cloud image, wherein the one or more first pixel points are pixel points constituting the 2D points in the 2D point cloud image;

determining a third proportion of a number of the one or more first pixel points in the non-enclosed region to a number of the one or more first pixel points comprised in the 2D point cloud image; and determining, according to the third proportion, the consistency degree that the 2D point cloud image has with the reference plane graph after the at least one similarity transformation is performed each time.

13. The method of claim 8, wherein determining the consistency degree that the 2D points in the 2D point cloud image have with the reference points in the reference plane graph after the at least one similarity transformation is performed each time comprises:

determining third pixel points obtained through a projection of an image acquiring device in the 2D point cloud image according to pose information of the image acquiring device during acquisition of image information after the at least one similarity transformation is performed each time on the 2D point cloud image, wherein the image information is used for constructing the 3D point cloud;

determining a fourth proportion of a number of the third pixel points in a non-enclosed region to a number of the third pixel points comprised in the 2D point cloud image; and determining, according to the fourth proportion, the consistency degree that the 2D point cloud image has with the reference plane graph after the at least one similarity transformation is performed each time.

14. The method of claim 8, wherein determining, according to the consistency degree determined after at least one similarity transformation is performed, the transformation relationship of matching the 3D points in the 3D point cloud with the reference points in the reference plane graph comprises:
determining a 2D transformation matrix for matching the 2D points in the 2D point cloud image with the reference points in the reference plane graph according to the consistency degree determined after the at least one similarity transformation is performed; and
determining the transformation relationship of matching the 3D points in the 3D point cloud with the reference points in the reference plane graph based on the 2D transformation matrix.

15. A non-transitory computer-readable storage medium having stored thereon computer-executable instructions that, when executed by a processor, cause the processor to perform operations of the information processing method of claim 1.

16. A positioning method, comprising:
obtaining target image information of a target object acquired by an image acquiring device;
comparing the target image information with three-dimensional (3D) points in a 3D point cloud, wherein the 3D point cloud is used for representing 3D space information of the target object, each 3D point in the 3D point cloud corresponds to projection coordinates, the projection coordinates are determined based on consistency of a two-dimensional (2D) point cloud image with a reference plane graph, the 2D point cloud image is generated from projection of the 3D point cloud on a horizontal plane, and the reference plane graph is used for representing a projection image with reference coordinates that is obtained through projection of the target object on the horizontal plane; and
positioning the image acquiring device according to projection coordinates corresponding to one or more 3D points matching the target image information,
wherein the 2D point cloud image is generated by:
determining at least one plane comprised in the 3D point cloud according to 3D point information of the 3D point cloud;
determining to-be-filtered-out 3D points according to a number of 3D points comprised in each of the at least one plane and a normal direction of each of the at least one plane;
deleting the to-be-filtered-out 3D points from the 3D point cloud to obtain remaining 3D points of the 3D point cloud; and
projecting the remaining 3D points on the horizontal plane according to the 3D point information of the remaining 3D points to generate the 2D point cloud image resulting from the projection of the 3D point cloud on the horizontal plane.

17. A positioning device, comprising:
a memory storing processor-executable instructions; and
a processor arranged to execute the processor-executable instructions to perform operations of claim 16.

18. An information processing device, comprising:
a memory storing processor-executable instructions; and
a processor configured to execute the processor-executable instructions to perform operations of:
obtaining three-dimensional (3D) point information of a 3D point cloud;
generating, based on the 3D point information, a two-dimensional (2D) point cloud image from projection of the 3D point cloud on a horizontal plane; and
determining projection coordinates of 3D points comprised in the 3D point cloud in a reference coordinate system of a reference plane graph based on a consistency degree that the 2D point cloud image has with the reference plane graph, wherein the reference plane graph is used for representing a projection graph with reference coordinates that is obtained through the projection of a target object on the horizontal plane, and the 3D point cloud is used for representing 3D space information of the target object,
wherein generating, based on the 3D point information, the 2D point cloud image from the projection of the 3D point cloud on the horizontal plane comprises:
determining at least one plane comprised in the 3D point cloud according to the 3D point information of the 3D point cloud;
determining to-be-filtered-out 3D points according to a number of the 3D points comprised in each of the at least one plane and a normal direction of each of the at least one plane;
deleting the to-be-filtered-out 3D points from the 3D point cloud to obtain remaining 3D points of the 3D point cloud; and
projecting the remaining 3D points on the horizontal plane according to the 3D point information of the remaining 3D points to generate the 2D point cloud image resulting from the projection of the 3D point cloud on the horizontal plane.

19. A non-transitory computer-readable storage medium having stored thereon computer-executable instructions that, when executed by a processor, cause the processor to perform operations of the positioning method of claim 16.

* * * * *